Nov. 27, 1928.
W. B. LEACH, JR
1,692,847
METHOD AND DEVICE FOR DISCHARGING CHLORINE FROM TANK CARS
Filed Aug. 2, 1927
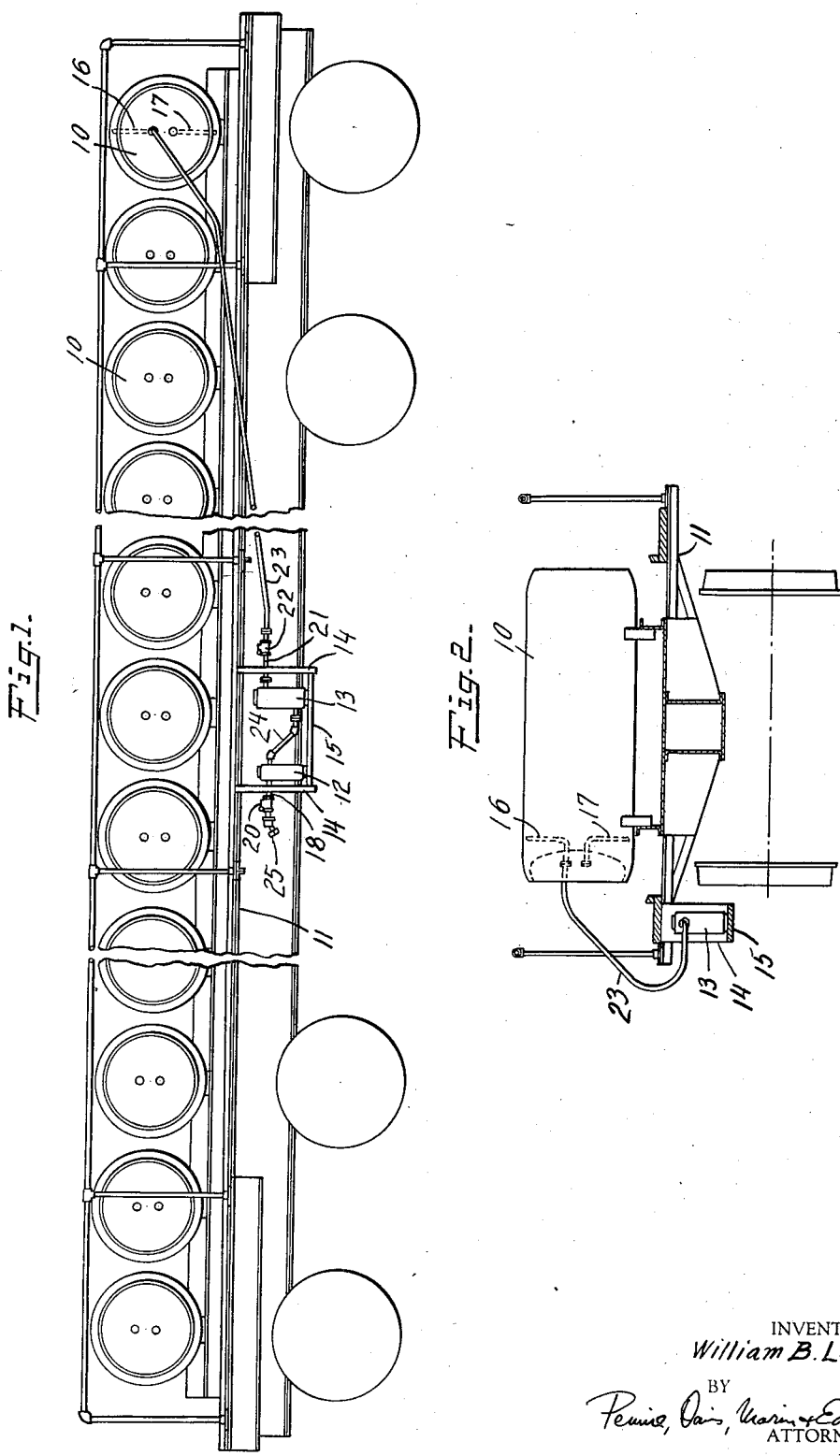
INVENTOR
William B. Leach Jr.
BY
ATTORNEYS Patented Nov. 27, 1928.

1,692,847

UNITED STATES PATENT OFFICE.

WILLIAM B. LEACH, JR., OF NIAGARA FALLS, NEW YORK, ASSIGNOR TO THE MATHIESON ALKALI WORKS, OF NEW YORK, N. Y., A CORPORATION OF VIRGINIA.

METHOD AND DEVICE FOR DISCHARGING CHLORINE FROM TANK CARS.

Application filed August 2, 1927. Serial No. 210,096.

This invention relates to an improvement in tank cars for shipping liquid chlorine and similar liquefied gases. Liquid chlorine is commonly transported in tank cars; the tank cars consist of a car carrying from one to four large tanks or a greater number of small tanks. The requirements of safety in transportation make these tanks of relatively expensive construction. To effect the discharge of the liquid chlorine from such tanks on delivery, it is common practice to introduce compressed air over the liquid chlorine to force it out through a discharge connection the inlet to which is submerged in the liquid chlorine in the tank. So far as discharge of the liquid chlorine is concerned, this practice is quite satisfactory, but, due to the moisture usually present in air, it frequently entails severe corrosion of the tanks.

In accordance with the present invention, air-drying means are mounted on the car so as to be carried thereby as is also a coupling connected to the inlet of the air-drying means, adapted for easy connection to and disconnection from a source of compressed air, such as the compressed air line ordinarily used for connection to the tankage on the car, and means are provided for connecting the outlet of the air-drying means with the tankage on the car. The air-drying means may comprise a separator for the elimination of entrained water followed by a silica gel absorber or calcium chloride drier. By making the air-drying means part of the car, proper drying of the air used for discharging the liquid chlorine is insured and opportunity is afforded the shipper of the liquid chlorine to see that the air-drying means are in proper condition before each shipment leaves the place of manufacture.

One form of apparatus embodying the invention is illustrated, diagrammatically, in the accompanying drawing, in which Fig. 1 is a side view of a multi-unit tank car embodying the invention and Fig. 2 is an end view of the same tank car. It will be understood that the invention is also useful in connection with tank cars in which the tankage consists of one or but a few relatively large tanks.

Referring to the drawings, the tanks 10 are supported on the frame 11 of the multi-unit tank car and air-drying means are also mounted on the frame so as to be carried thereby. The air-drying means illustrated consists of a separator 12 and a drier or absorber 13. The separator and the drier or absorber are carried in a frame made up of members 14 and 15 which in turn are supported by the car frame. The means for supporting the separator and drier or absorber must be such as to prevent displacement in transit. The separator 12 and the drier or absorber 13 are connected by a pipe 24 and an inlet pipe 18 to the separator and an outlet pipe 21 from the drier or absorber are provided as shown. Check valves 20 and 22 are arranged in connections 18 and 21 to prevent reverse flow through the air-drying means or the air line. In a multi-unit car, such as that illustrated, a flexible connection 23 is provided for connecting the outlet pipe 21 with the several tanks as desired. Where the air tankage consists of but one or a few tanks this connection may be made a unitary part of the car. Where a flexible connection is used, such as connection 23, it may or may not be carried with the car in transit. A flexible coupling 25 is carried by the end of pipe 18 for connection, through a suitable line, with some source of compressed air at the point of delivery of the liquid chlorine. This coupling may be of any convenient type adapted for easy connection to and disconnection from the usual compressed air lines or hose.

In using the improved tank car of this invention, the shipper charges the tankage on the car with liquid chlorine and at the same times sees that the drying means is in proper condition. If calcium chloride is used in the drier or absorber 13, he may renew this drying agent, or if silica gel is used, he may reactivate the gel or see that it is replaced with activated gel. The car is then dispatched to the point of delivery. Then, when delivered, instead of connecting a compressed air line to the several tanks to effect the discharge of the liquid chlorine, the compressed air line is connected to the flexible coupling 25. Thus, the compressed air for effecting the discharge of the liquid chlorine is stripped of moisture by the drying means mounted on and carried by the car before it enters the tankage thereby eliminating corrosion which might otherwise ensue.

Ordinarily, the shipper's interest in the condition of the tank car is much greater than that of the consignee. This invention largely eliminates the danger and expense which too easily follow any laxness on the part of the consignee in being sure that the air used for effecting discharge of the liquid chlorine from the tank car is substantially dry, and makes it possible for the shipper, in the great majority of cases, to protect the equipment used for transportation of the liquid chlorine and to keep it at all times in first class condition, which is much more satisfactory than dependence upon periodic inspection.

I claim:

In combination with a tank car for shipping liquid chlorine and similar liquefied gases including tankage therefor, air-drying means mounted on and carried by said car, coupling means mounted on and carried by said car and adapted for easy connection to and disconnection from a source of compressed air, a connection between said coupling means and the inlet to said air-drying means, and means for connecting the outlet from said air-drying means with said tankage.

In testimony whereof I affix my signature.

WILLIAM B. LEACH, Jr.